United States Patent [19]

Mueller

[11] 4,038,128

[45] July 26, 1977

[54] INSULATION BLANKET SHEARING AND APPLYING MACHINE FOR DUCTWORK AND THE LIKE

[75] Inventor: Thomas L. Mueller, St. Louis, Mo.

[73] Assignee: Engel Industries, Inc., St. Louis, Mo.

[21] Appl. No.: 751,392

[22] Filed: Dec. 17, 1976

[51] Int. Cl.$^2$ .............................................. B32B 31/04

[52] U.S. Cl. ...................................... 156/355; 83/319; 91/413; 91/461; 156/521; 156/522

[58] Field of Search ............... 156/362, 353, 354, 355, 156/521, 522; 83/203, 205, 319, 320; 91/413, 461; 137/625.6

[56] References Cited

U.S. PATENT DOCUMENTS

| | | | |
|---|---|---|---|
| 3,299,757 | 1/1967 | Schumacher et al. ................. | 83/320 |
| 3,301,115 | 1/1967 | Walsh .................................... | 83/319 |

*Primary Examiner*—Edward G. Whitby

[57] ABSTRACT

A compact machine for measuring, cutting and applying insulation blanket material onto sheet metal workpieces as they flow along a conveyorized lower line. The blanket material flows along an upper path. A flying shear mechanism, which travels a short distance along this path, is driven downstream when the trailing edge of a workpiece is sensed. Rack and sector mechanism brings the shear to an incisive stop at its downstream cutting position when the shear blade strikes its cutting block; hence the kinetic energy of the downstream movement is utilized for shearing. The shear remains in downstream position, to serve as a gage for starting the blanket material, until a sensor in the lower flow path senses the leading edge of the next sheet metal workpiece; this raises the shear blade and moves the shear mechanism to upstream position. A pneumatic system accurately times the cut-off mechanism to match the shearing of the blanket material to the length of the workpiece, leaving a margin if desired.

9 Claims, 6 Drawing Figures

INSULATION BLANKET SHEARING AND APPLYING MACHINE FOR DUCTWORK AND THE LIKE

BACKGROUND OF THE INVENTION

The present invention relates to cut-off machines for material, such as insulation blanket material, supplied in broad rolls; and has particular use in providing adhered insulated linings for sheet metal duct workpieces as they flow along a production line prior to being bent to duct-like shape.

Commercially produced rectangular sheet metal ducts are conventionally made as relatively short standardized duct pieces cut, notched and edged while flowing along a production line. Prior to bending them to rectangular shape, insulation blanket material is adhered to what will become their inner surfaces. The application of the blanket material has not lent itself readily to production line methods.

In somewhat related fields of production, shears have been made to cut lengths of material flowing from rolls while still in motion. Such machine assemblies are commonly referred to as "flying shears". Typically the shear mechanism, or at least its cutting block, starts from rest in an upstream position, and accelerates on downstream until its speed approximates that of the material to be sheared. As its maximum speed is reached, the shear is actuated, but the cutting block mechanism continues its downstream movement as it decelerates. It then reverses its movement to return to upstream position.

SUMMARY OF THE INVENTION

The objects of the present invention include the following: to provide a simple mechanism which shears at the point of farthest downstream movement and to utilize the inertia of the downstream movement for shearing; to permit the shear blade to remain in its downstream position between cutting operations, so as to serve as a gage for the leading edge of the material to be sheared; to provide for cutting and applying blanket material for sheet metal workpieces moving along the conveyorized flow path, precisely adjusted to the lengths of workpieces to be insulated; to provide uninsulated margins therealong; and to provide a pneumatic system for timed operation of such a machine.

These purposes, and others which will be apparent from the disclosure which follows, are obtained by the present invention by mechanism which may be briefly summarized as follows:

Sheet metal workpieces, whose upper surfaces are sprayed with an adhesive, move along a lower conveyorized flow path. Above it, mechanism provides an upper path for the feed of coiled insulation blanket material and further provides support for a shear carriage having linear actuators to move it between upstream and downstream position. Insulation feed rolls are located upstream of such upstream position of the shear carriage; while downstream of its downstream position are rolls which draw the workpiece and insulation material to adhere them together and propel them further downstream.

The preferred mechanism which supports the shear carriage and coordinates its downstream movement with shearing has as its base a pair of racks which extend linearly along opposite sides of the flow path. Spur gears which ride on the racks are mounted onto the ends of a transverse shaft which bears a carriage having a cutting block and a transverse shear blade. The blade is rotated against the cutting block by sectors which engage the racks upstream of the spur gears. Hence when the linear actuators draw the carriage upstream the sectors raise the blade, permitting the coiled insulation material to be fed beneath it. When the actuators drive the carriage downstream, the sectors rotate the blade until it engages the cutting block, stopping further downstream movement; hence the inertia of the carriage is used for shearing. A pneumatic system operates the machine under the control of a reversible pneumatic valve having a sensor wand extending into the flow path of the sheet metal workpieces. When a workpiece leading edge is sensed, the valve passes pressure to one conduit supplying the linear actuators in a parallel circuit, to drive them upstream and thus raise the shear. In the same conduit is a branch which includes, in series, an adjustable time delay and a pneumatic clutch; when after time delay the clutch is engaged, it drives the insulation feed rolls. When the sensor senses the passage of the trailing edge of the sheet metal workpiece, it reverses the control valve, disengaging the insulation feed clutch and supplying pressure to the other sides of the linear actuators, thus driving the shear downstream until the sector operated blade strikes the cutting block and brings the downstream movement to a stop.

The invention may be best understood by reference to the preferred embodiment illustrated in the drawings and hereafter described.

Description of the Preferred Embodiment

Figure 1:
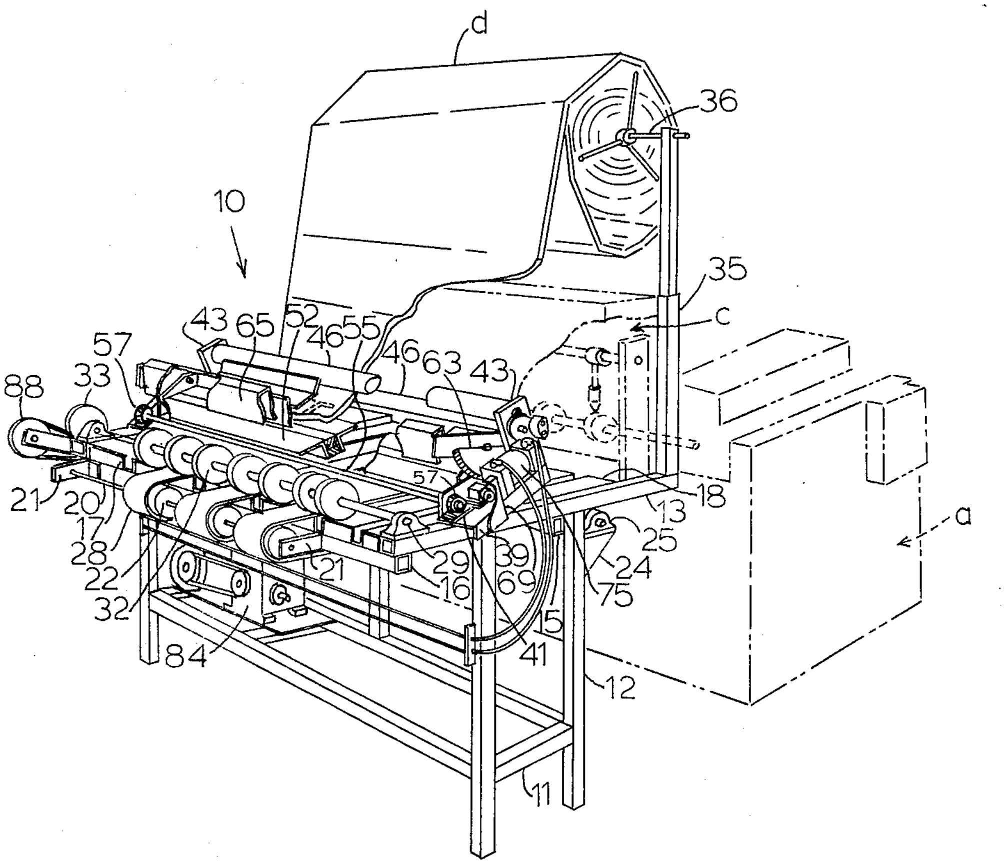
FIG. 1 is a perspective view partly from the rear of an insulation blanket shearing and applying machine embodying the present invention. The phantom lines indicate a machine which precedes it in a production line, and an adhesive spray booth mounted on forward projections.

The cut-off machine of the present invention is designed for utilization in a sheet metal fabrication line, as used in forming insulated sections of sheet metal ducts. In the drawings, the present machine generally designated 10 follows in the production line a conventional edge forming machine designated *a* shown in phantom lines in FIG. 1, which feeds sheet metal workpieces horizontally.

The present machine 10 has a table frame 11 including legs 12 which support a pair of longitudinal side edge beams 13. Welded to their lower surfaces and extending transversely to join them are a forward beam 15 and an aft beam 16. These support several spaced table beams 17 whose upper surfaces provide a working plane *b*. Spaced table beams 17 are here chosen, rather than a continuous table surface, to accommodate such downward longitudinal flanges as may be formed on the sheet metal workpieces. Some of the beams 17 (those beneath the conveyor belts hereafter described) stop at the front beam 15; others have forward-projecting ends 18 which commence immediately aft of the adhesive spray equipment *c*.

Supported on forward projecting ends of the edge beams 13 is conventional adhesive spray equipment generally designated *c*, including a plurality of aligned spray nozzles mounted above the working plane *b* and directed downwardly toward it. The nozzles are supplied with adhesive in a conventional manner. At the sides of and behind the nozzles is a spray enclosure.

A conventional belt conveyor system is provided to move sheet metal workpieces along the working plane *b*. As seen in FIG. 1, a driven shaft 20, supported in bushings in stub beams 21 projecting aft from the aft beam 16, mount drive pulleys 22. Forward of the front beam 15 and secured to the forward legs 12 are brackets 24 mounting forward pillow blocks 25 which support a forward transverse driving shaft 26 on which driving pulleys 27 are mounted. The diameters of the pulleys 22, 27 are such that conveyor belts 28 mounted around them will be drawn aft along and be supported by the upper surfaces of some of the table beams 17.

On a driven cross-shaft 29, supported by pillow blocks 30 above the working plane *b* just forward of the aft ends of the table beams 17, are spacedly secured several flexible rubber drawing rolls 32, which bear downwardly on the table beams 17 and the conveyor belts 28 thereon. A drive sprocket 33 is mounted on the left end of the shaft 29.

Erected on forward projecting extensions of the side edge beams 13 are standards 35, which may be adjustable in height, at whose upper ends is mounted a transverse reel 36 (or, if preferred, a cradle) for supporting a roll of insulation blanket material *d* which is to be fed slantingly downward and aft to flow along a slanting upper plane of movement *e*, hereafter defined. The plane of movement *e* terminates aft at the working plane *b* substantially where the drawing rolls 32 contact the working plane *b*.

The present flying shear cut-off mechanism generally designated 38 is so constructed as to operate along the upper plane of movement *e*. Supported by vertical plates 39 welded to the side beams 13 are ramp plates 40 which slope downward and aft parallel to and below the slanting plane of movement *e*. On the ramp plates 40 are mounted, parallel to each other, left and right toothed racks 41 which provide track-like support along both sides of the path of the flowing insulation material *d*, for movement of the present flying shear. The material *d* is fed by apparatus which includes insulation feed roll support plates 43 mounted in the vertical plates 39 which have aligned transverse bores which support the upper and lower shafts 44, 45 of closely-spaced upper and lower insulation feed rolls 46.

Figure 4:
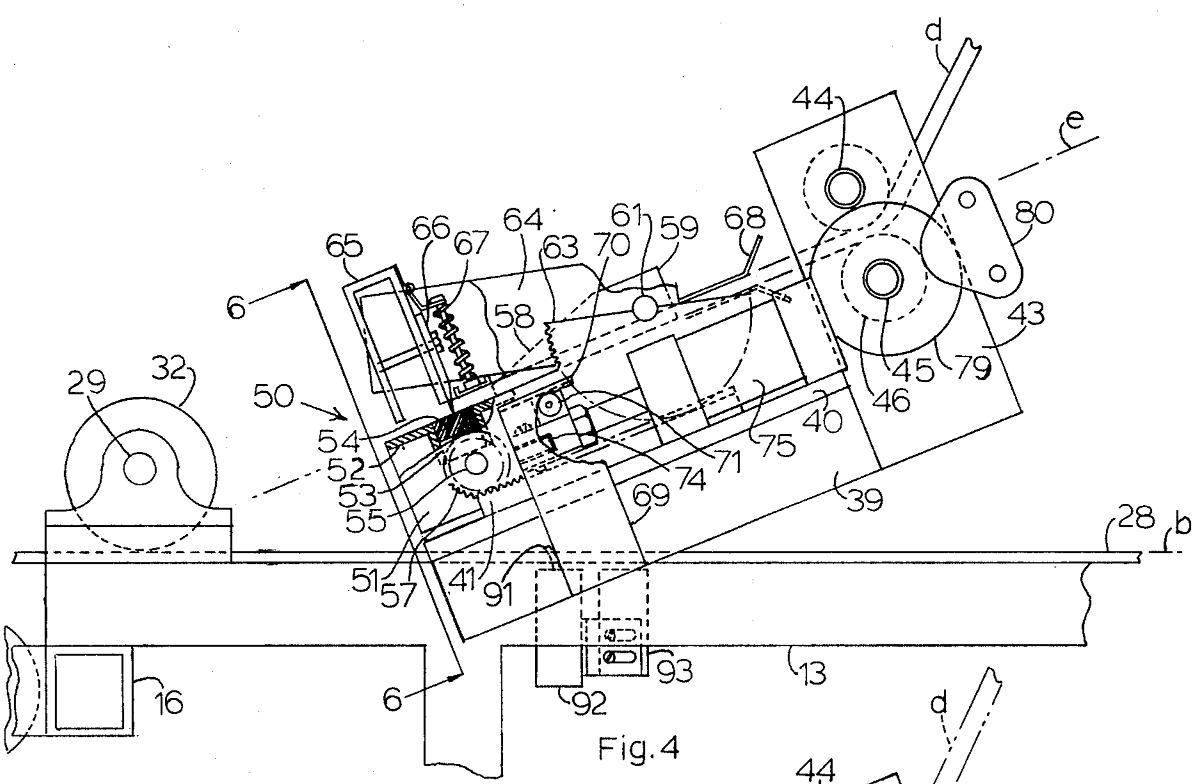
FIG. 4 is an enlarged detail of the insulation feed and flying shear mechanism as seen from the right of FIG. 1, with the shear carriage in cut-off position and the insulation material at rest.

Supported for movement on the racks 41 is a shear carriage generally designated 50. As best seen in FIG. 4, it consists of left and right lower vertical side edge plates 51 beneath which are welded a pair of transverse carriage angles 52 connected by a filler block 53 across whose upper surface extends a resilient cutting block 54 such as hard polyurethane. This surface and its movement define the upper plane of movement *e*. A transverse carriage shaft 55, extending through aligned transverse bores in the left and right edge plates 51, has, affixed outwardly thereof, spur gears 57 which ride on the lower portions of the racks 41. The spur gears 57 thus provide rear support for the shear carriage 50, which travels from the cutting position shown in FIG. 4, which is also its position when not operating, to the forward position shown in FIG. 5, to which it is drawn as a sheet metal workpiece travels thereunder.

Set inward from the vertical side edge plates 51 and there welded to the upper surfaces of the carriage angles 52 are vertical carriage extension plates 58 which have forward enlargements 59 penetrated by aligned transverse bores 60 located at a level slightly above that of the upper plane of movement *e*. Through the bores 60 extend stub shafts 61 on which are mounted a transverse shear blade assembly, rotatable relative to the carriage extension plates 58.

The shear blade assembly so mounted consists, at each side of the machine, of a gear sector 63, whose radius may be more than twice that of the spur gears 57, having teeth of similar size and mounted on the forward upper portions of the racks 41. To the inner surfaces of these sectors 63 are welded arms 64 which extend aft with clearance outwardly of the carriage extension plates 58. The aft ends of the arms 64 mount a transverse shear beam 65, which may be a heavy inverted channel as illustrated. To the forward side of the shear beam 65 is mounted a transverse shear blade 66 whose cutting edge is adjustably set slightly below the lower edge of the beam 65, and a conventional spring operated stripper bar assembly 67. A chute 68 is supported by the carriage extension plates, by brackets, not shown, to direct the flow of the insulation material *d* along the upper plane of movement *e*.

The sectors 63 provide forward support for the shear carriage 50, reacting imposed loads transmitted by the carriage extension plate 58 and the stub shafts 51. On movement from the rearward position shown in FIG. 4 to the forward position shown in FIG. 5, rotation of the sectors 63 raises the shear beam 65 as the carriage 50 is drawn forward and up the racks 41.

Figure 6:
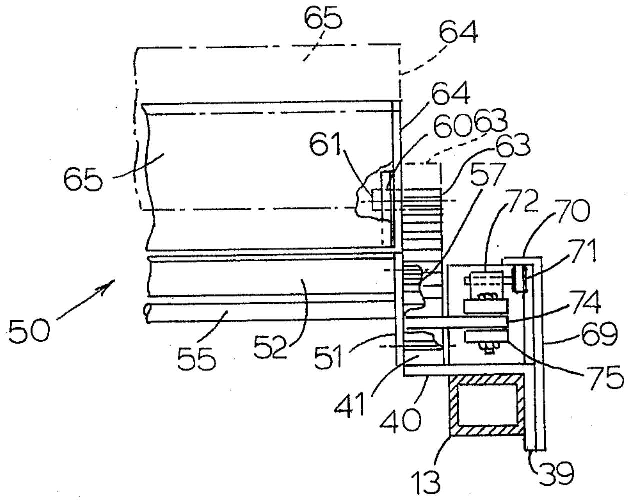
FIG. 6 is an enlarged fragmentary rear view as seen along line 6—6 of FIG. 4. The phantom lines show the parts in position corresponding to FIG. 5.

In its forward and aft movements, the shear carriage 50 is confined to movement along the racks 41 by inward facing angle plates 69, best seen in FIG. 6, welded to the vertical plates 39 which support the ramp plates 40 but extending spacedly above, and having inward flanges 70 which overlay horizontal rollers 71 projecting from roller support blocks 72. These blocks 72 are welded on top of horizontal lugs 74 which project sideward from the vertical side edge plates 51 of the shear carriage 50 and whose principal function is to move the carriage 50 to and between the position shown in FIGS. 4 and 5.

Figure 5:
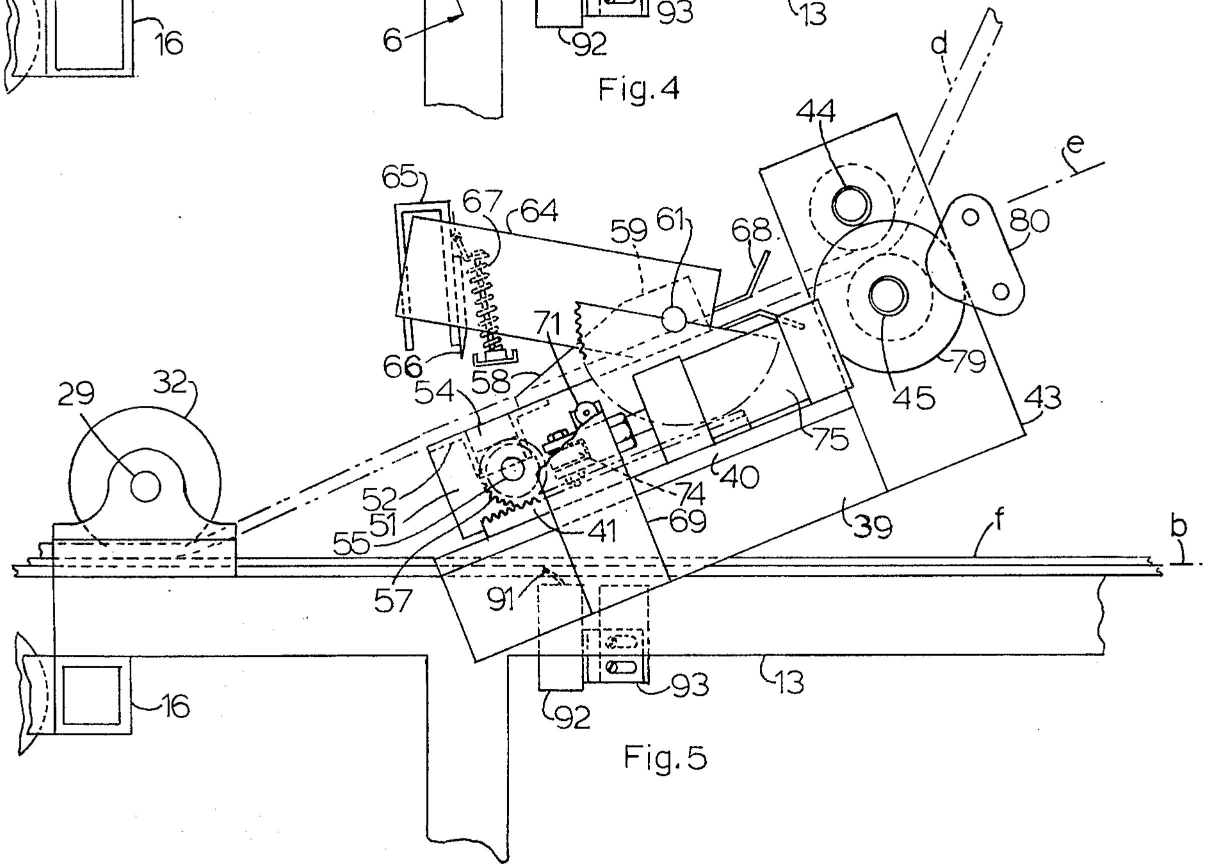
FIG. 5 is a view corresponding with FIG. 4 showing the insulation material being fed and the shear raised and its carriage moved forward, as a metal workpiece is passing through it.

The shear carriage 50, together with the rotatable shear blade mechanism heretofore described, is reciprocated by pneumatic actuators 75 whose square ends are mounted on the ramp plates 40 and whose aft fittings 76 engage the lugs 74. Retraction of the actuators 75 from their extended position shown in FIG. 4 to the retracted position of FIG. 5, draws the carriage 50 and said rotating mechanism forward and up the racks 41 as, simultaneously, rotation of the sectors 63 raises the shear beam 65, as shown in FIGS. 5 and 6.

The driving components will now be described. Affixed to the shaft 45 outward of the pinch roll support plate 43 at the side of the machine seen in FIGS. 4 and 5 is a brake disc 79, which rotates within a pneumatic actuated brake assembly 80 shown schematically. At the opposite side, the lower pinch roll support shaft 45 has a conventional pneumatic clutch 82, outwardly of which is a driving sprocket 83.

Figure 3:
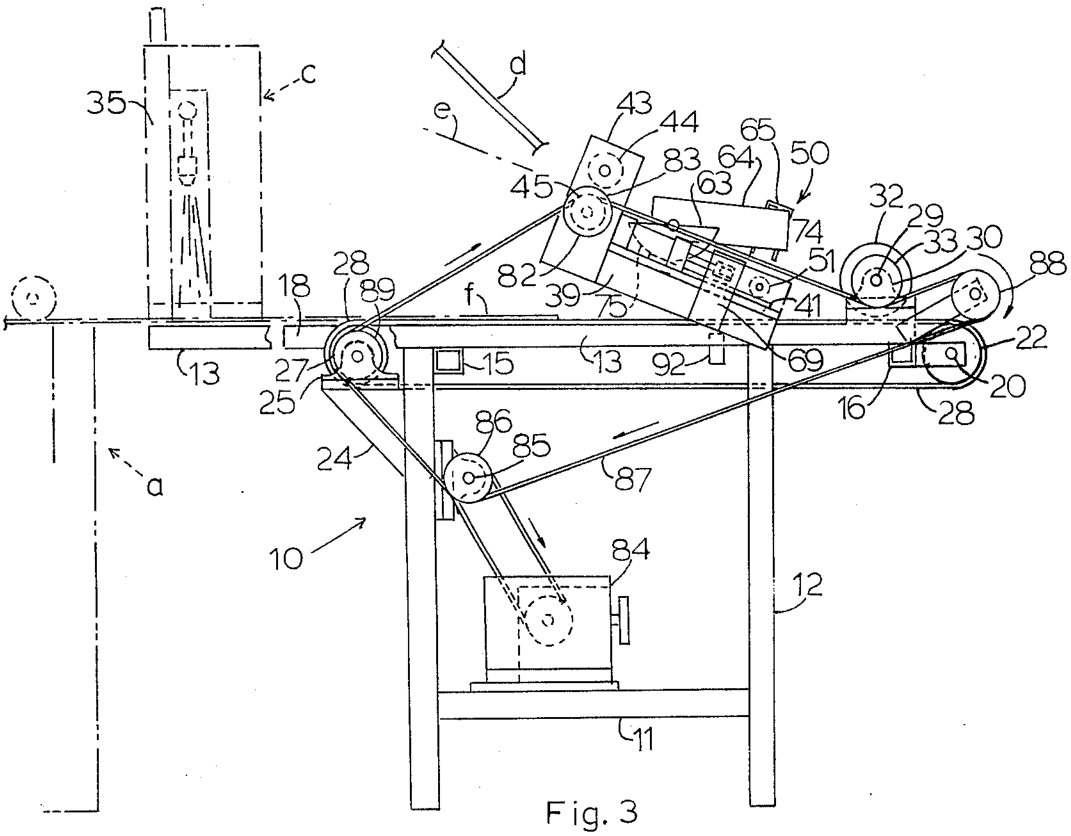
FIG. 3 is a side view of the machine taken from the left side of FIG. 1.

The chain and sprocket drive utilized is shown in the left side view, FIG. 3. From a conventional motor and gear reducer 84, power is supplied to a shaft 85 whose sprocket 86 drives a chain 87 which extends about a conveyor drive sprocket 89 on the forward shaft 46 which mounts the conveyor pulleys 27. It extends then over the clutch-driving sprocket 83, under the sprocket 33 on the drawing rolls 32, and over an idler sprocket 88.

Figure 2:
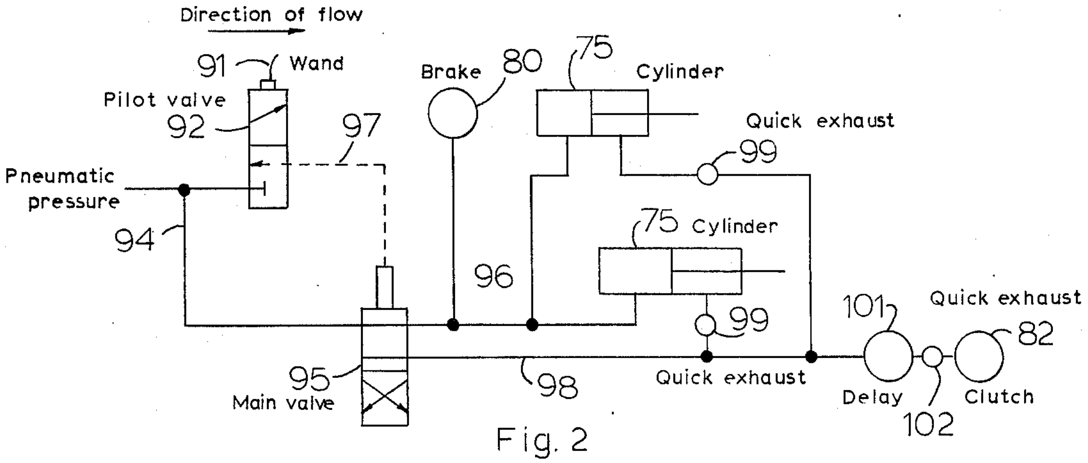
FIG. 2 is a schematic drawing of the pneumatic system utilized by the machine.

Pneumatic mechanism, shown schematically in FIG. 2, controls the commencement and cessation of flow of the insulation material *d*, as well as the reciprocation of the shear carriage 50 along the upper plane of movement *e*, with the accompanying raising and lowering of the shear beam 65. As a sheet metal workpiece *f* travels along the working plane *b* from right to left as in FIG. 5, its leading edge tilts rearward the upward-projecting sensor wand 91 of a conventional pneumatic pilot valve 92, thereby turning it on. The pilot valve 92 is mounted for fore-and-aft adjustment in slotted holes of a conventional bracket assembly 93 secured to the machine frame. As seen in FIG. 2, it is installed in one branch of a pneumatic conduit 94 supplied by an air pressure source, not shown, a parallel branch of which supplies a main pneumatic reversible valve 95. Before the pilot valve 92 is so turned on, the pressure so applied to the main valve 95 is conducted through it to what may be designated as the downstream pressure conduit 96 whose branches supply pneumatic pressure to the pneumatic brake assembly 80 and to the downstream-directed sides of the pneumatic cylinders 75. Thus, the shear carriage 50 is normally held in the downstream position, FIG. 4, with the shear beam 65 down.

However, when the wand 91 is tilted by the leading edge of a workpiece *f*, pneumatic pressure flows through the pilot valve 92 and the pilot conduit 97, reversing the main valve 95 to supply pneumatic pressure through an upstream pressure conduit 98 to branch supply lines to the upstream-directed sides of the pneumatic cylinder 75; in each of these supply lines conventional quick exhaust fittings 99 are interposed. Another branch of the downstream pressure conduit 98 supplies pressure through a conventional adjustable pneumatic time delay 101 to the pneumatic clutch 82, which is preceded by a conventional quick exhaust fitting 99.

Relating the pneumatic system shown in the diagram FIG. 2 to the mechanical apparatus, their functioning is as follows: When the shear is at rest, with its beam 65 lowered and its blade 66 in contact with the cutting block insert 52 of the shear carriage 50, the downstream pressure applied through the conduit 96 to the linear actuating cylinders 75 holds the carriage 50 in the downstream or cut-off position shown in FIg. 4. Insulation blanket material *d* rests against the shear blade 66, which serves as a starting gage. When a sheet metal workpiece *f* travels along the conveyor belts 28 in the right-to-left direction of flow shown in FIG. 5, and tilts the wand 91 of the pilot valve 92, the cylinders 75 retract, drawing the shear carriage 50 upstream along the slanting upper plane of movement *e* from the position shown in FIG. 4 to the position shown in FIG. 5. The rotation of the gear sectors 63 attendant to the upstream movement rotates the shear arm 64 upward as shown in FIG. 5. Meantime the pressure of the upstream pressure conduit 98 passes with adjustable delay through the time delay 101 to the clutch 82 which drives the insulation feed rolls 46, so that, on the expiration of the delay, the clutch 82 engages and insulation material *d* is fed through the chute 68 and beneath the raised shear blade 66, to flow to and beneath the drawing rolls 32, which press the insulation material *d* against the adhesive-sprayed upper surface of the workpiece *f*.

When the trailing edge of the workpiece *f* passes over the wand 91 of the pilot valve 92, it cuts off the pneumatic pressure through the pilot conduit 97 thus causing the main valve 95 to resume its position shown schematically in FIG. 2. The pressure on the downstream sides of the linear actuators 75 is exhausted through the quick exhausts 99, and the pressure to the clutch 82 is exhausted through the quick exhaust 102. As the power supplied to the insulation feed rolls 46 is thus declutched, pressure is simultaneously applied again through the downstream pressure conduit 96 to the disc brake 80. However, the brake 80 is of limited capacity, selected to bring the rotating feed rolls 46, their shafts 44, 45 and clutch part attached to a stop over that time interval required for the downstream movement.

Meantime, the pressure now applied through the downstream conduit 96 is fed to the downstream-directed sides of the pneumatic actuating cylinders 97, extending them downstream; and through their connection to the lugs 74 which project from the carriage side plates 51, driving the carriage 50 along the upper plane of movement *e* to the downstream position shown in FIG. 4. The same downstream movement rotates the sectors 63 and the attached arms 64 to drive the shear beam 65 sharply downward so that its blade 66 shears the insulation blanket material *d* against the cutting block insert 54. Contact of the blade 66 with the insert 54 brings the carriage downstream movement to an abrupt and sudden stop; the entire inertia of such movement is thus utilized for cutting, as well as the angular inertia of the shear beam 65.

After being separated by the shear, the sheared-off insulation material continues to be drawn downstream between the pressure of the drawing rolls 32 and the resistance of the conveyor belts 28 and table beams 17. Thus the workpiece *f* is discharged with the cut-off insulation material adhered to its upper surface.

Since the sensor 91 of the pilot valve 92 is first contacted below its tip end by a passing sheet metal workpiece, but is not released until the workpiece trailing edge passes over its tip end, if the pneumatic controls functioned instantaneously there would be an inherent excess of actuating time, and the piece of insulation material to be measured would be slightly longer than the workpiece. Further, an uncovered workpiece margin is usually required. These problems are solved by adjustment of the pneumatic time delay 101 and by adjusting the position of the pilot valve 92 in the slotted holes of its bracket assembly 93.

The present machine is of exceptionally short length, and hence well suited for insertion in a production line. This is due in part to the short stroke over which the pneumatic cylinders 75 bring the shear carriage 50 to its maximum speed at the downstream position, FIG. 4; at this point their inertia is utilized for shearing, so that no further downstream movement is required, as in conventional flying shears.

To the best of Applicant's knowledge, no one has heretofore utilized a pair of single pneumatic actuators for the purpose of driving both ends of a shear carriage or comparable machine; it would be feared that uneven flow of air pressure would drive one side faster than the other. This problem is solved in the present case by the rigid cross connections between the elements which operate on the racks 41. At the rear end, the gearing of the spur gears 57 to the racks 41 and the synchronization of their travel is controlled by the transfer shaft 55 which connects them. A similar inner-engagement is provided by the shear arms 64 and beam 65 which synchronize the angular rotation of the sectors 63. Hence, the pneumatic actuators 65 reliably drive the carriage from the forward position shown in FIG. 5, at which it rests while the insulation material *d* feeds, to accelerate to the downstream position, FIG. 4, and be suddenly stopped, with its inertia utilized.

From this disclosure variations in details of construction and utilization will be apparent to those skilled in the art.

I claim:

1. A cut-off machine comprising means to provide track-like support along both sides of a path of material flow, a cutting block supported thereby for movement therealong and extending across the under side of such path, a shear blade extending across such path above the cutting block, and mechanical means so inter-engaging the means to provide track-like support, the cutting block, and the shear blade as to raise the shear blade from the cutting block when the cutting block is moved upstream along such track-like support means and to drive it against the cutting block when moved downstream and by such driving to stop further downstream movement, whereby the inertia of such downstream movement is utilized for cutting.

2. A flying cut-off mechanism comprising a pair of racks arranged linearly along opposite sides of a flow path, a transverse shaft extending thereover and having secured at its ends spur gears engaging said racks, a carriage supported by said shaft and bearing a cutting block, a transverse shear blade extending across said path and having at its ends operating arms mounted for rotation on said carriage, sectors secured to said arms and engaging said racks upstream of said spur gears, and actuator means to drive the carriage downstream and retract it upstream, whereby downstream movement of the carriage will so rotate the sectors as to cause the shear blade to rotate toward and engage the cutting block, thereby stopping further downstream movement and utilizing the inertia of the carriage for shearing.

3. A flying cut-off as defined in claim 2, together with means to feed material to be sheared along an upper flow path defined by the plane of movement of the upper surface of said cutting block, means to establish a lower flow path in the same direction therebeneath, means along said lower flow path to sense the leading edge and trailing edge of a workpiece conveyed therealong, and means, responsive to sensing the trailing edge of such workpiece, to initiate discontinuance of the feed of such material to be sheared and to drive said carriage downstream and thereby shear such material, together with means, responsive to the sensing of the leading edge of a following workpiece, to retract said carriage to upstream position and on a time delay to initiate the flow of such material to be sheared along said upper flow path, whereby, prior to the flow of such a following workpiece and while the cutting block is in downstream position, the shear blade serves as a gage for the material to be sheared.

4. A machine for cutting insulation blanket material and applying it to sheet metal workpieces moving along a conveyorized flow path, comprising means to provide an upper path of movement above such conveyorized flow path and to support thereon a shear carriage and shear blade mounted thereto, actuator means to move said shear carriage to and between upstream and downstream positions along such upper path, means at a point along the conveyorized flow path to sense the arrival of the leading edge of a workpiece thereat and the departure of its trailing edge therefrom, means, responsive to sensing such arrival, to raise the shear blade and travel the shear carriage beneath the leading edge of the insulation material to such upstream position, means, located upstream of such upstream position of such shear carriage and responsive with time delay to sensing such arrival, to provide powered feed of such insulation material between the shear blade and the shear carriage, means, downstream of such downstream position a distance less than the length of such a workpiece, to draw the workpiece and insulation material together and propel them further downstream, means, effective after said downstream means commences so to draw together, to discontinue the powered feed of the insulation material upstream of the shear carriage, and means, responsive to sensing the passage of the trailing edge of such workpiece, to propel the shear carriage downstream and simultaneously commence driving the shear blade across the insulation material shearingly against the shear carriage.

5. A machine for cutting insulation blanket material as defined in claim 4, wherein said means to discontinue the powered feed of the insulation material is likewise responsive to sensing the passage of the trailing edge of such workpiece.

6. A machine for cutting insulation blanket material and adhering it to sheet metal workpieces moving along a conveyorized flow path, comprising the machine as defined in claim 4, together with means above and at the forward end of such flow path to apply adhesive to the upper surfaces of such workpieces, and in which said means to draw the workpiece and insulation material further comprises means to press them adherently together.

7. For driving a cut-off mechanism downstream while timing the feed of material to be sheared so as to match the lengths of workpieces being conveyed along a path, a pneumatic system comprising a reversing pneumatic valve, a pair of reversible linear actuators connected in parallel circuit to said valve by a first common conduit, whereby pressure therein drives the actuators in a downstream direction relative to such path and a second common conduit, whereby pressure therein drives said actuators in an upstream direction, said second common conduit having a branch containing in series a pneumatic time delay and a pneumatic clutch, whereby the engagement of said clutch by pressure in said branch causes such material to be fed in a downstream direction, together with workpiece leading edge sensing means to so switch said reversing valve as to supply pressure to said second common conduit, whereby to drive linear actuators in an upstream direction and on time delay to engage said clutch and workpiece trailing edge sensing means to so switch said reversing valve as to supply pressure to said first common conduit, whereby to permit said clutch to disengage and to drive said actuators in a downstream direction.

8. A pneumatic system as defined in claim 7, wherein the workpiece leading edge sensing means and trailing edge sensing means comprise a single sensor of the type having an actuating wand projecting at least partly downstream, and the pneumatic time delay is adjustable, whereby to compensate for the inherent excess of actuating time provided by such actuating wand-type sensor.

9. A pneumatic system as defined in claim 8, wherein the pneumatic time delay is adjustable, whereby to provide for cutting a length of such material shorter than the workpiece when leading and trailing edges are so sensed and for matching such lengths to such workpiece in such manner as to provide an uncovered margin at its leading edge.

* * * * *